(12) United States Patent
Mash

(10) Patent No.: US 11,094,146 B1
(45) Date of Patent: Aug. 17, 2021

(54) INTELLIGENT ELECTRICAL SYSTEM FOR VEHICLE

(71) Applicant: Amazon Technologies, Inc., Seattle, WA (US)

(72) Inventor: Jonathan Mash, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/790,684

(22) Filed: Feb. 13, 2020

Related U.S. Application Data

(63) Continuation of application No. 16/507,916, filed on Jul. 10, 2019, now Pat. No. 10,573,098, which is a continuation of application No. 15/691,238, filed on Aug. 30, 2017, now Pat. No. 10,366,549.

(51) Int. Cl.
*G07C 5/08* (2006.01)
*G08G 5/00* (2006.01)
*B60L 1/00* (2006.01)
*B64C 39/02* (2006.01)

(52) U.S. Cl.
CPC ............... *G07C 5/08* (2013.01); *B60L 1/00* (2013.01); *B64C 39/024* (2013.01); *G07C 5/0808* (2013.01); *G08G 5/0021* (2013.01); *G08G 5/0069* (2013.01); *B64C 2201/024* (2013.01); *B64C 2201/108* (2013.01); *B64C 2201/141* (2013.01)

(58) Field of Classification Search
CPC ...... G07C 5/08; G07C 5/0808; G08G 5/0069; G08G 5/0021; B60L 1/00; B64C 39/024; B64C 2201/108; B64C 2201/024; B64C 2201/141

USPC ............................................................ 701/3
See application file for complete search history.

(56) References Cited

U.S. PATENT DOCUMENTS

| | | | |
|---|---|---|---|
| 8,738,268 B2 * | 5/2014 | Karimi | H02J 3/38 701/99 |
| 2016/0350671 A1 * | 12/2016 | Morris, II | G05B 23/0229 |
| 2017/0092023 A1 * | 3/2017 | Ishii | B60L 1/006 |

(Continued)

OTHER PUBLICATIONS

Office Action for U.S. Appl. No. 15/691,238, dated Sep. 20, 2018, Mash, "Intelligent Electrical System for Vehicle", 17 pages.

*Primary Examiner* — Muhammad Shafi
(74) *Attorney, Agent, or Firm* — Lee & Hayes, P.C.

(57) ABSTRACT

An electrical system for a vehicle may include a main power supply and a power supply controller electrically connected to the main power supply and configured to selectively electrically connect the main power supply to, and disconnect the main power supply from, a vehicle subsystem. The electrical system may also include a supervisor power supply controller configured to receive signals indicative of an operational status of the vehicle, and determine, based at least in part on the signals, expected signals associated with operation of a plurality of vehicle subsystems. The supervisor power supply controller may also receive signals associated with operation of a vehicle subsystem, and determine that the signals associated with operation of the vehicle subsystem are indicative of a fault. The supervisor power supply controller may cause the power supply controller associated with the vehicle subsystem to disconnect the vehicle subsystem from the main power supply.

20 Claims, 6 Drawing Sheets

(56) References Cited

U.S. PATENT DOCUMENTS

2017/0129603 A1* 5/2017 Raptopoulos ........ G08G 5/0069
2019/0347874 A1 11/2019 Mash

* cited by examiner

INTELLIGENT ELECTRICAL SYSTEM FOR VEHICLE

CROSS REFERENCE TO RELATED APPLICATIONS

This application is a continuation of, and claims priority to, co-pending, commonly-owned U.S. patent application Ser. No. 16/507,916, filed Jul. 10, 2019, which is a continuation of and claims priority to U.S. patent application Ser. No. 15/691,238, filed Aug. 30, 2017, both of which are incorporated by reference herein in their entirety.

BACKGROUND

A vehicle may have many electrically-powered subsystems for operating the vehicle. In order to ensure continued operation of the vehicle when a problem with one or more of the subsystems occurs, the vehicle may have redundant subsystems and power sources. However, some vehicles may not be able to carry the added weight of redundant subsystems and power sources. In addition, some vehicles have a single or few power sources for supplying electric power to the electrically-powered subsystems, with the subsystems being electrically connected to a common power supply. As a result, if a fault occurs in one of the subsystems, it may result in interrupting the supply of power to other subsystems. For example, a short-to-ground in a single subsystem may result in a current spike that interrupts the power supply to other subsystems. While fuses and circuit breakers may sometimes reduce the effects of such occurrences, in many instances, the response may be too slow to prevent interruption of power to other subsystems, which may be detrimental to operation of the vehicle.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
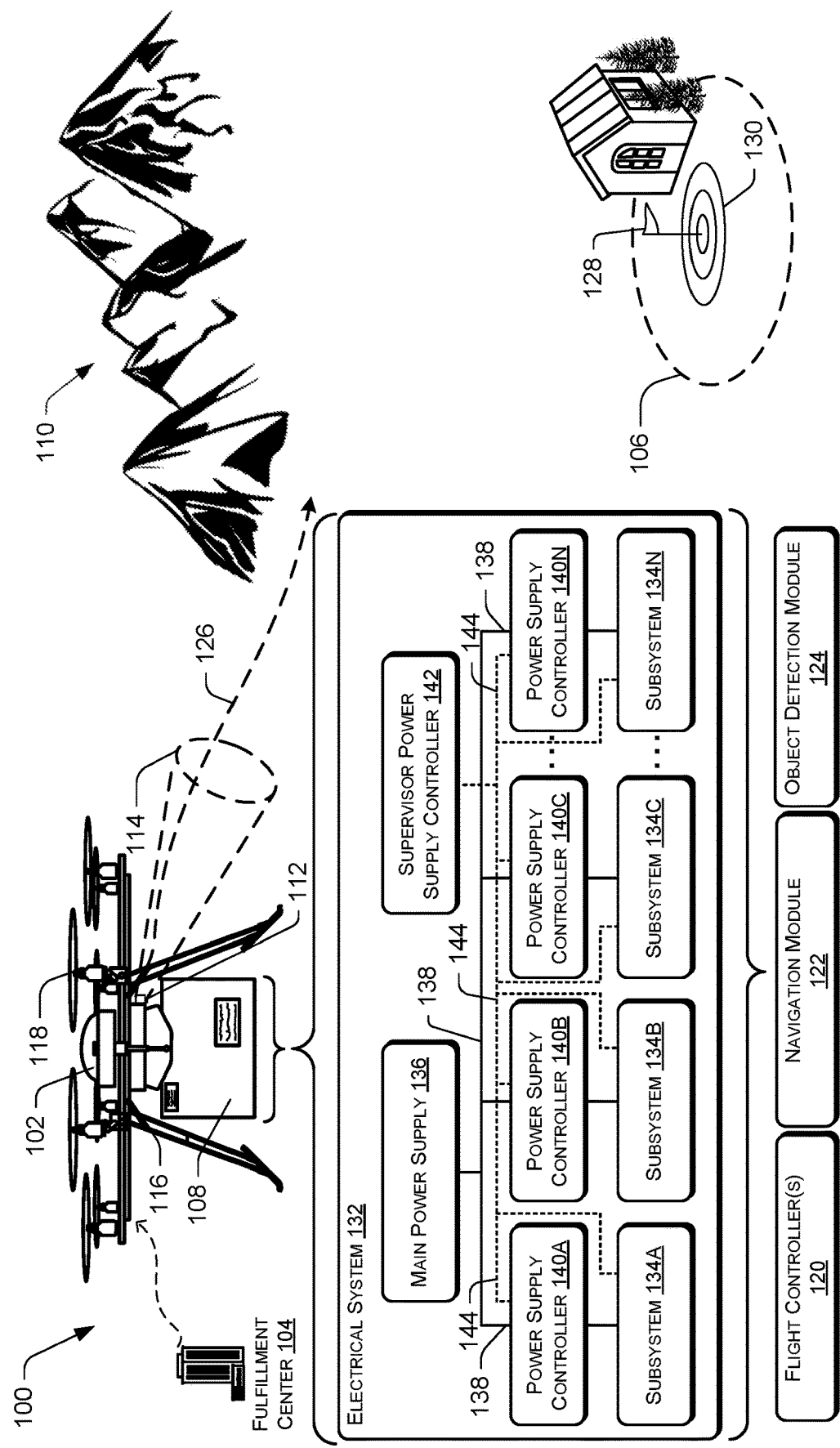
FIG. 1 is a schematic diagram of an illustrative environment that includes an unmanned aerial vehicle (UAV) including an illustrative electrical system for supplying electrical power to the UAV.

This disclosure is generally directed to an intelligent electrical system for supplying electrical power to a vehicle. The vehicle may include a plurality of electrically-powered subsystems, and the electrical system may supply electrical power to the subsystems, such that a fault in a single subsystem does not result in interruption of electrical power supplied to other subsystems of the vehicle. In some examples, this may prevent propagation of an electrical fault with a single subsystem throughout the remainder of the electrical system. In some examples, the electrical system may include one or more batteries configured to supply electrical power to the vehicle, and the electrical system may be configured to determine when the level of charge of one or more of the batteries is below a minimum desired level, and discontinue operation of non-critical subsystems, so that the vehicle can travel to a location to recharge one or more of the batteries.

The electrical system, in some examples, may include a main power supply configured to supply electrical power to a plurality of subsystems of a vehicle. For example, the main power supply may be configured to supply power to a main power bus. The electrical system may also include a first power supply controller electrically connected to the main power supply and configured to selectively electrically connect the main power supply to, and disconnect the main power supply from, a first vehicle subsystem. The electrical system may also include a second power supply controller electrically connected to the main power supply and configured to selectively electrically connect the main power supply to, and disconnect the main power supply from, a second vehicle subsystem. The electrical system may further include a supervisor power supply controller in communication with the first power supply controller and the second power supply controller. The supervisor power supply controller may be configured to receive signals indicative of an operational status of the vehicle, and determine, based at least in part on the signals indicative of the operational status of the vehicle, expected signals associated with operation of the first vehicle subsystem and expected signals associated with operation of the second vehicle subsystem. The expected signals may be indicative of expected performance of the first vehicle subsystem and expected performance of the second vehicle subsystem, respectively. The supervisor power supply controller may also be configured to receive signals associated with operation of the first and second vehicle subsystems, with the signals associated with operation of the first and second vehicle subsystems being indicative of performance of the first and second vehicle subsystems, respectively. The supervisor power supply controller may also be configured to determine that one or more of (1) the signals associated with operation of the first vehicle subsystem or (2) the signals associated with operation of the second vehicle subsystem are outside respective ranges of the expected signals associated with operation of the first and second vehicle subsystems, respectively. Based at least in part on this determination, the supervisor power supply controller may be configured to cause one or more of the first or second power supply controllers to disconnect from the main power supply the one or more of the respective first or second vehicle subsystems for which the signals associated with operation of the first or second vehicle subsystems are outside the respective ranges of the expected signals associated with operation of the respective first or second vehicle subsystems.

In some examples, the supervisor power supply controller may monitor operation of one or more vehicle subsystems and cause a power supply controller corresponding to a subsystem experiencing a fault to disconnect the subsystem experiencing a fault from the main power supply. This may prevent interruption of electrical power supplied to other subsystems of the vehicle when a single subsystem experiences a fault that might otherwise result in the fault propagating throughout a portion or all of the electrical system. In this example manner, the supervisor power supply controller may isolate subsystems experiencing a fault from the remainder of the electrical system.

The vehicle may be, in some examples, an unmanned aerial vehicle (UAV), and the first and second subsystems may include one or more of one or more flight controllers, one or more navigation systems, or one or more sensor systems. In some examples, the signals indicative of the operational status of the vehicle may include one or more signals indicative that the UAV is on the ground, taking-off, flying, or landing. Based at least in part on these signals, the supervisor power supply controller may be configured to determine expected signals associated with operation of the respective vehicle subsystems, which may be indicative of the expected performance of the respective vehicle subsystems. In some examples, the signals associated with operation of the respective vehicle subsystems may include signals associated with one or more of the voltage, current, or temperature associated with operation of the respective subsystem.

In some examples, the supervisor power supply controller may be configured to determine the expected signals associated with operation of one or more of the respective subsystems and determine the expected signals associated with operation of the one or more respective subsystems using one or more of heuristics or machine learning. For example, the supervisor power supply controller may be configured to determine the expected signals associated with operation of the one or more respective subsystems by processing data associated with operation of the vehicle via a fault prediction model deployed by a machine learning engine. For example, training data including signals indicative of the operational status of the vehicle, and signals associated with operation of the respective vehicle subsystems during normal or expected operation may be processed by a machine learning engine to develop a fault prediction model. In some examples, the fault prediction model may be used to detect and/or predict when a vehicle subsystem is operating in a manner consistent with a fault or an imminent fault (or inconsistent with normal operation). For example, a vehicle subsystem including a sensor may generate signals associated with its operation, which are received by the fault prediction model. When the vehicle is operating according to a certain operational status, the sensor of the vehicle subsystem, when functioning properly, may, for example, normally produce a relatively low voltage drop, draw a relatively low current, or operate at a relatively low temperature. As a result, if the supervisor power supply controller receives signals from the sensor of the vehicle subsystem that are higher than would be expected during proper operation, or are outside a range of expected values, the fault prediction model may determine that the sensor is operating in a faulty manner or is expected to operate in a faulty manner in the near future. In some examples, under such circumstances, the supervisor power supply controller may cause the power supply controller associated with the sensor to disconnect the vehicle subsystem including the sensor from the main power supply, so that if the sensor fails, it will not interrupt the power supply to other vehicle subsystems, and the vehicle may continue operating without the faulty sensor. In some examples, the supervisor power supply controller may be in communication with a controller of the vehicle and notify the controller that the sensor has been disabled, so that the vehicle controller can adapt to operation without the sensor.

This disclosure is also generally directed to a vehicle including a frame and a propulsion system coupled to the frame to cause movement of the vehicle. The vehicle may also include an electrical system including a main power supply, which may include an electrical power source configured to supply electrical power to a plurality of vehicle subsystems. The electrical system may also include a power supply controller electrically connected to the main power supply and configured to selectively electrically connect the main power supply to, and disconnect the main power supply from, one of the vehicle subsystems. The electrical system may also include a supervisor power supply controller in communication with the power supply controller, and the supervisor power supply controller may be configured to receive signals indicative of an operational status of the vehicle, and determine, based at least in part on the signals indicative of the operational status of the vehicle, expected signals associated with operation of the plurality of electrically-powered vehicle subsystems. The supervisor power supply controller may also be configured to receive signals associated with operation of the vehicle subsystem indicative of performance of the vehicle subsystem. The supervisor power supply controller may also be configured to determine that the signals associated with operation of the vehicle subsystem are indicative of a fault associated with operation of the vehicle subsystem, and alter operation of the vehicle based at least in part on determining that the signals associated with operation of the vehicle subsystem are indicative of a fault associated with operation of the vehicle subsystem.

In some examples, the electrical power source may include at least one battery, and the supervisor power supply controller may be configured to receive signals indicative of a level of charge of the at least one battery, and when the level of charge is below a minimum level of charge, the supervisor power controller may be configured to cause at least one of the plurality of vehicle subsystems to discontinue operation. For example, the plurality of vehicle subsystems may include a plurality of navigation systems and a plurality of sensor systems, and the supervisor power supply controller may be configured to cause at least one of the plurality of navigation systems or at least one of the plurality of sensor systems to discontinue operation, for example, to conserve power and extend the range of the vehicle.

The techniques and systems described herein may be implemented in a number of ways. Example implementations are provided below with reference to the following figures.

FIG. 1 is a schematic diagram of an illustrative environment 100 that includes a UAV 102 configured to travel through the environment 100. The example environment 100 includes a fulfillment center 104 where the UAV 102 may originate a flight directed to a destination 106, such as a location associated with a recipient of a package 108 transported by the UAV 102. The example environment 100 shown in FIG. 1 includes terrain 110, which may include various features, such as mountains, trees, buildings, bridges, telephone poles and wires, and electrical power towers and power wires.

The UAV 102 may be equipped with one or more sensors and/or cameras 112 providing a field of view 114, which may be used for guidance and/or navigation. For example, the sensor(s) and/or camera(s) 112 may enable detection of obstacles to avoid, detect an objective marker, assist with navigation, and/or for other reasons. The UAV 102 may, at times, conduct autonomous flight using information captured by the sensor(s) and/or camera(s) 112.

The UAV 102 may be equipped with a number of components to enable the UAV 102 to perform operations during the delivery of the package 108. For example, the UAV 102 may include a frame 116 and a propulsion system 118 coupled to the frame 116 and configured to propel the UAV 102 through the environment 100. The components may also include one or more flight controllers 120, a navigation module 122, and an object detection module 124, as well as other components discussed below with reference to FIGS. 2-5. For example, the UAV 102 may travel under control of the flight controller(s) 120 and along the flight path 126 toward the destination 106. The flight controller(s) 120 may receive data from the navigation module 122 to assist the flight controller(s) 120 with following the flight path 126 to arrive at the destination 106. The flight controller(s) 120 may continually, or from time to time, provide controls to cause change in a velocity of the UAV 102, a change in heading, a change in altitude, a change in orientation, and/or other changes (e.g., pitch, roll, yaw, hover, etc.), for example, based at least in part on data received from the navigation module 122. In addition, the UAV 102 may execute different controls based on different flight scenarios, such as a takeoff stage, a transport stage, a package deposit stage, and/or a landing stage of flight.

The object detection module 124 may identify objects in imagery captured by the sensor(s) and/or camera(s) 112, which may be used to inform the flight controller(s) 120, and for other reasons, such as to provide communications to the object or to a central command, etc. For example, the object detection module 124 may identify objective markers 128 via analysis of imagery captured by the sensor(s) and/or camera(s) 112. The objective markers 128 may be associated with a waypoint, a drop zone 130 for the destination 106, and/or associated with other locations.

As shown schematically in FIG. 1, the UAV 102 may include an electrical system 132 for supplying electrical power to one or more subsystems 134 of the UAV 102. As explained in more detail, the vehicle subsystems 134 may include one or more electrically-powered and/or controlled components of the UAV 102 that form the one or more systems that enable and/or control operation of the UAV 102, such as, for example, the flight controller(s) 120, the navigation module 122, and the object detection module 124. For example, the electrical system 132 may include a main power supply 136 configured to supply power to the plurality of subsystems 134, for example, via a main power bus 138. The example electrical system 132 shown in FIG. 1 also includes a plurality of power supply controllers 140 electrically connected to the main power supply 136 and configured to selectively electrically connect the main power supply 136 to, and disconnect the main power supply 136 from, respective vehicle subsystems 134. For example, as shown in FIG. 1 each of the power supply controllers 140A, 140B, 140C, through 140N is electrically coupled to the main power bus 138 and is associated with the respective vehicle subsystems 134A, 134B, 134C, through 134N. Each of the power supply controllers 140A, 140B, 140C, through 140N is configured to selectively electrically connect the main power bus 138 to, and disconnect the main power bus 138 from, the respective vehicle subsystems 134A, 134B, 134C, through 134N. In some examples, one or more of the power supply controllers 140 may be configured to monitor operation of the respective vehicle subsystem 134 and if a fault is detected by the power supply controller 140, disconnect the respective vehicle subsystem 134 from the main power supply 136. For example, if the power supply controller 140 detects an abnormally high (or low) voltage drop, current draw, and/or temperature associated with operation of the respective vehicle subsystem 134, the power supply controller 140 may disconnect the respective vehicle subsystem 134 from the main power supply 136, thereby isolating the vehicle subsystem 134 from the remainder of the electrical system 132, which may prevent a malfunction of the vehicle subsystem 134 from interrupting the power supply to other vehicle subsystems 134. In some examples, the power supply controllers 140 may be configured to more quickly disconnect the respective vehicle subsystem 134 from the main power supply 136 than, for example, fuses or circuit breakers.

In the example shown, electrical system 132 also includes a supervisor power supply controller 142 in communication with the power supply controllers 140 and/or the vehicle subsystems 134, for example, via a communication bus 144 coupled to the supervisor power supply controller 142 and each of the power supply controllers 140 and/or each of the vehicle subsystems 134. The communication bus 144 may be any known type of wireless or hard-wired communication medium. As explained herein, the supervisor power supply controller 142, in some examples, may be configured to receive signals indicative of the operational status of the UAV 102, for example, from one or more of the power supply controllers 140 and/or one or more of the vehicle subsystems 134, and determine, based at least in part on the signals indicative of the operational status of the UAV 102, expected signals associated with operation of one or more of the vehicle subsystems 134.

For example, the operational status of the example UAV 102 may correspond to being on the ground (or another surface) but neither in the process of landing nor taking-off, being on the ground but in the process of taking-off or landing, being in the air and being in the process of taking-off or landing, being in-flight and either cruising at a substantially constant altitude and/or direction, or being in-flight and ascending, descending, and/or changing direction of travel. The signals indicative of the operational status may be signals received from one or more of the flight controller(s) 120, the navigation module 122, the object detection module 124, or any other sensors, cameras, or other systems of the UAV 102 that may be used to determine the operational status of the UAV 102. In some examples, the supervisor power supply controller 142 may be configured to receive signals from one or more of the various above-identified systems and determine the operational status of the UAV 102.

Based at least in part on these signals indicative of the operational status of the UAV 102, the supervisor power supply controller 142 may be configured to determine expected signals associated with operation of one or more of the vehicle subsystems 134. For example, based on historical data, the supervisor power supply controller 142 may be configured to determine an expected operation of one or more of the vehicle subsystems 134, or in some examples, determine the signals associated with the expected operation of the one or more vehicle subsystems 134. In some examples, the supervisor power supply controller 142 may receive signals associated with operation of one or more of the vehicle subsystems 134, for example, from one or more of the power supply controllers 140 and/or one or more of the vehicle subsystems 134. In some examples, the signals associated with operation of the one or more vehicle subsystems 134 may be indicative of the performance of the one or more vehicle subsystems 134. The supervisor power supply controller 142 may determine, in some examples, that the signals associated with operation of the one or more vehicle subsystems 134 are indicative of a fault associated with operation of the one or more vehicle subsystems 134.

For example, the signals indicative of the operational status of the UAV 102 may indicate that the UAV 102 is landing. Historical data may indicate that during landing a global positioning system (GPS) associated with the navigation module 122 may not be operating at a high level (e.g., the GPS may not be causing much of a voltage drop, drawing much current, and/or exhibiting a temperature increase from operation). In contrast, historical data may indicate that during a landing, cameras and sensors associated with the object detection module 124 may be operating at a high level (e.g., they may be causing a relatively large voltage drop, drawing a relatively large amount of current, and/or exhibiting a relative temperature increase from operation). Thus, if the supervisor power supply controller 142 receives signals associated with the GPS that indicates operation at a high level, which would be unexpected based on historical data, then the supervisor power supply controller 142 may determine (or predict) that there is a fault with the operation of the GPS. In contrast, if the supervisor power supply controller 142 receives signals associated with cameras and sensors associated with the object detection module 124 during landing of the UAV 102 that indicate operation at a low level (e.g., they may be causing a relatively low voltage drop, drawing a relatively low amount of current, and/or exhibiting little or no relative temperature increase from operation), it may be an indication that the sensors or cameras are not operating properly. Thus, by determining the expected operation of the one or more vehicle subsystems 134 based at least in part on the operational status of the UAV 102, the supervisor power supply controller 142 may be able to detect (or predict) a fault occurring with operation of one or more vehicle subsystems 134.

In some examples, the supervisor power supply controller 142 may determine that the signals associated with operation of the one or more vehicle subsystems 134 are indicative of a fault by comparing the signals associated with operation of the respective vehicle subsystems 134 with the expected signals associated with operation of respective vehicle subsystems 134. In some examples, the supervisor power supply controller 142 may determine that the signals associated with operation of the one or more vehicle subsystems 134 are indicative of a fault by detecting, or predicting, that the respective vehicle subsystem 134 is operating outside expected operational parameters based at least in part on the signals indicative of the operational status of the UAV 102. In some examples, the supervisor power supply controller 142 may determine the expected signals associated with operation of the one or more vehicle subsystems 134 by using the signals indicative of the operational status of the vehicle to identify from previous operation of the vehicle previously received signals associated with operation of the respective vehicle subsystems 134 corresponding to the operational status of the UAV 102. In some examples, as explained in more detail herein, the supervisor power supply controller 142 may determine the expected signals associated with operation of the one or more vehicle subsystems 134 by processing data associated with operation of the UAV 102 via a fault prediction model deployed by a machine learning engine.

In some examples, the supervisor power supply controller 142 may be further configured to alter operation of the UAV 102 based at least in part on determining that the signals associated with operation of the one or more vehicle subsystems 134 are indicative of a fault associated with operation of the respective vehicle subsystem 134. For example, the supervisor power supply controller 142 may alter operation of the UAV 102 by discontinuing operation of the respective vehicle subsystem 134 experiencing a fault and/or isolating the respective vehicle subsystem 134 from the main power supply 136 of the UAV 102. In some examples, the supervisor power supply controller 142 may cause the power system controller 140 associated with the vehicle subsystem 134 experiencing a fault to disconnect the vehicle subsystem 134 from the main power supply 136. In some examples, the supervisor power supply controller 142 may communicate with one or more flight controllers 120 of the UAV 102, so that the one or more flight controllers 120 may cause the UAV 102 to initiate travel to a designated location, such as, for example, a vehicle maintenance or service center, to address the vehicle subsystem 134 experiencing the fault. In some examples, the decision to initiate travel to a designated location may be based on the particular vehicle subsystem 134 experiencing the fault. For example, if the UAV 102 includes several sensor systems, and the supervisor power supply controller determines that one of the sensors may have a fault, but that the UAV 102 may operate safely using the remaining sensors, then the one or more flight controllers 120 and/or the supervisor power supply controller 142 may control the UAV 102 such that it continues on its flight path 126 to its intended destination 106 instead of initiating travel to the designated location for service.

In some examples, the main power supply 136 may include an electrical power source configured to supply electrical power to a plurality of vehicle subsystems 134. For example, the electrical power source may include at least one battery, and the supervisor power supply controller 142 may be configured to receive signals indicative of a level of charge of the at least one battery. If the level of charge is below a minimum level of charge, the supervisor power supply controller 142 may be configured to cause at least one of the vehicle subsystems 134 to discontinue operation, for example, in order to conserve power. For example, the UAV 102 may include more than one navigation system and/or more than one sensor system. The supervisor power supply controller 142, in order to conserve energy of the one or more batteries, may cause one or more of the navigation systems and/or one or more of the sensor systems to discontinue operation. This may permit the UAV 102 to extend its range of operation relative to if all of the navigation systems and all of the sensor systems continued to operate.

Figure 2:
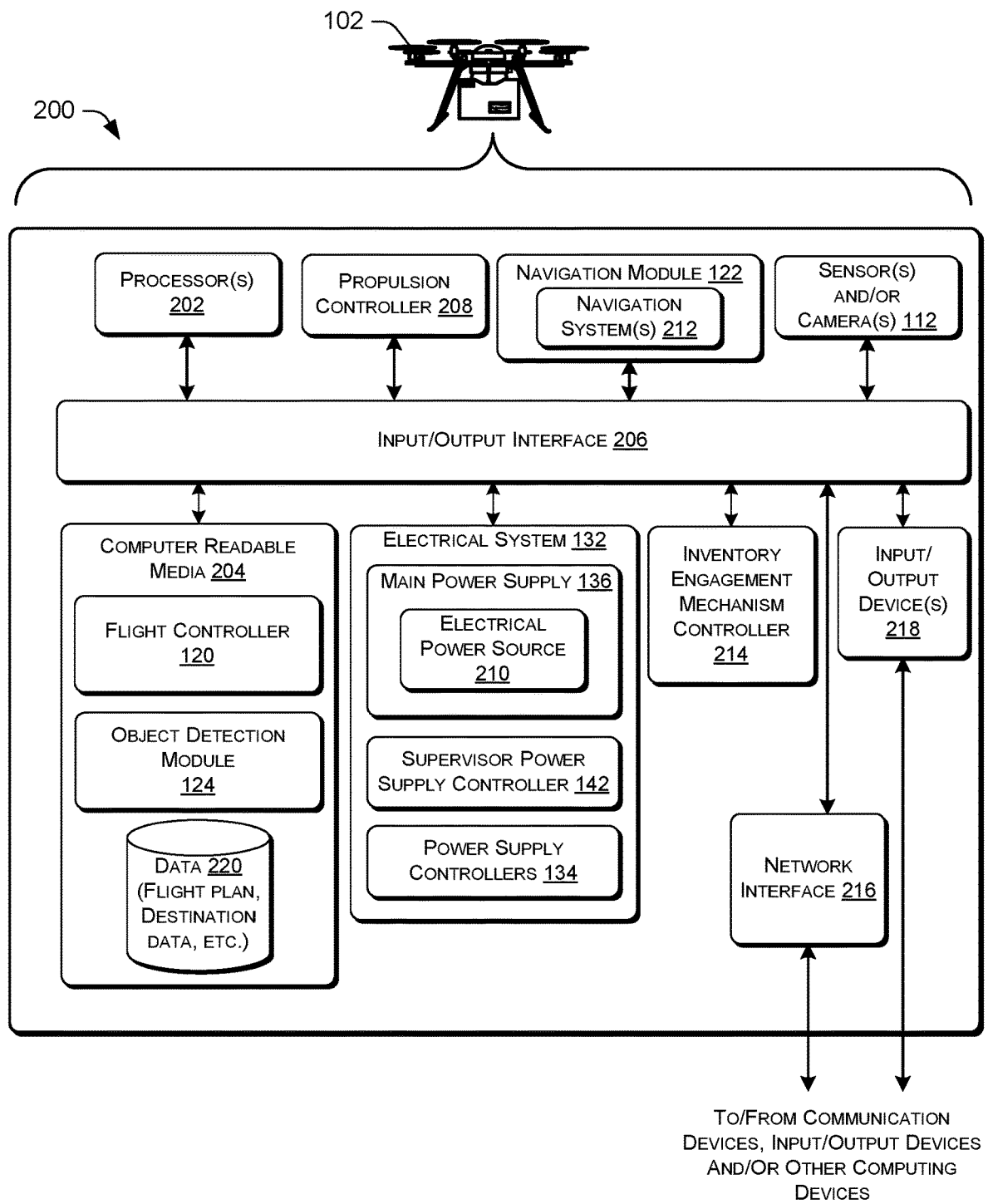
FIG. 2 is a block diagram of an illustrative UAV architecture of the UAV shown in FIG. 1.

FIG. 2 is a block diagram of an illustrative UAV architecture 200 of the UAV 102. The UAV architecture 200 may be used to implement the various systems, devices, and techniques discussed above. In the illustrated implementation, the UAV architecture 200 includes one or more processors 202, coupled to a non-transitory computer readable media 204 via an input/output (I/O) interface 206. The UAV architecture 200 may also include a propulsion controller 208, the electrical system 132 including the main power supply 136 including an electrical power source 210, the supervisor power supply controller 142, and one or more power supply controllers 134, and/or the navigation module 122. The navigation module 122 may include one or more navigation systems 212, such as, for example, a GPS, an inertial navigation system (INS), and/or a vision-aided navigation system (VAINS) to assist with determining the position and/or heading of the UAV 102. In some examples, the navigation system(s) 212 may include a system for determining the altitude of the UAV 102, such as, for example, a pressure transducer and/or altimeter. Other navigation systems are contemplated. The example UAV architecture 200 further includes an inventory engagement mechanism controller 214 to interact with the package 108, the sensor(s) and/or camera(s) 112, a network interface 216, and one or more input/output (I/O) devices 218.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 204 may be configured to store executable instructions/modules, data, flight paths, and/or data items accessible by the processor(s) 202. In various implementations, the non-transitory computer readable media 204 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 204 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 206. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 216.

In some implementations, the I/O interface 206 may be configured to coordinate I/O traffic between the processor(s) 202, the non-transitory computer readable media 204, and any peripheral devices, the network interface 216 or other peripheral interfaces, such as input/output devices 218. In some implementations, the I/O interface 206 may perform any necessary protocol, timing or other data transformations to convert data signals from one component (e.g., non-transitory computer readable media 204) into a format suitable for use by another component (e.g., processor(s) 202). In some implementations, the I/O interface 206 may include support for devices attached through various types of peripheral buses, such as, for example, a variant of the Peripheral Component Interconnect (PCI) bus standard or the Universal Serial Bus (USB) standard. In some implementations, the function of the I/O interface 206 may be split into two or more separate components, such as, for example, a north bridge and a south bridge. Also, in some implementations, some or all of the functionality of the I/O interface 206, such as an interface to the non-transitory computer readable media 204 may be incorporated directly into the processor(s) 202.

The propulsion controller 208 may be configured to communicate with the navigation module 122 and/or adjust the power of one or more propulsion devices of the propulsion system 118, such as, for example, propeller motors, to guide the UAV 102 along the flight path 126. The propulsion devices may be any known type of propulsion devices. The electrical system 132 may be configured to control the charging and any switching functions associated with one or more power modules (e.g., batteries) of the UAV 102.

As explained herein, the navigation module 122 may include systems to facilitate navigating the UAV 102 to and/or from a location. The inventory engagement mechanism controller 214 may be configured to communicate with actuator(s) and/or motor(s) (e.g., servo motor(s)) used to engage and/or disengage inventory, such as the package 108. For example, when the UAV 102 is positioned over a surface at a delivery location, the inventory engagement mechanism controller 214 may provide an instruction to a motor that controls the inventory engagement mechanism to release the package 108.

As shown in FIG. 2, the network interface 216 may be configured to allow data to be exchanged between the UAV architecture 200, other devices attached to a network, such as other computer systems, and/or with UAV control systems of other UAVs. For example, the network interface 216 may enable wireless communication between numerous UAVs. In various implementations, the network interface 216 may support communication via wireless general data networks, such as a Wi-Fi network. For example, the network interface 216 may support communication via telecommunications networks such as cellular communication networks, satellite networks, and the like.

The I/O devices 218 may, in some implementations, include sensors such, as accelerometers and/or other I/O devices commonly used in aviation. Multiple I/O devices 218 may be present and controlled by the UAV architecture 200. One or more of the sensors may be utilized to assist in landings as well as avoiding obstacles during flight.

In some embodiments, the computer readable media 204 may store the flight controller 120, the navigation module 122, and the object detection module 124. The components may access and/or write data 220, which may include flight plan data, log data, destination data, image data, and object data, and so forth.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations. Additional information about the operations of the modules of the UAV 102 is discussed below.

Although FIG. 1 depicts a UAV 102, other vehicles may incorporate the electrical system 132 described herein, such as land vehicles (cars, trucks, etc.), marine vehicles (boats, ships, etc.), and/or other types of aircraft.

Figure 3:
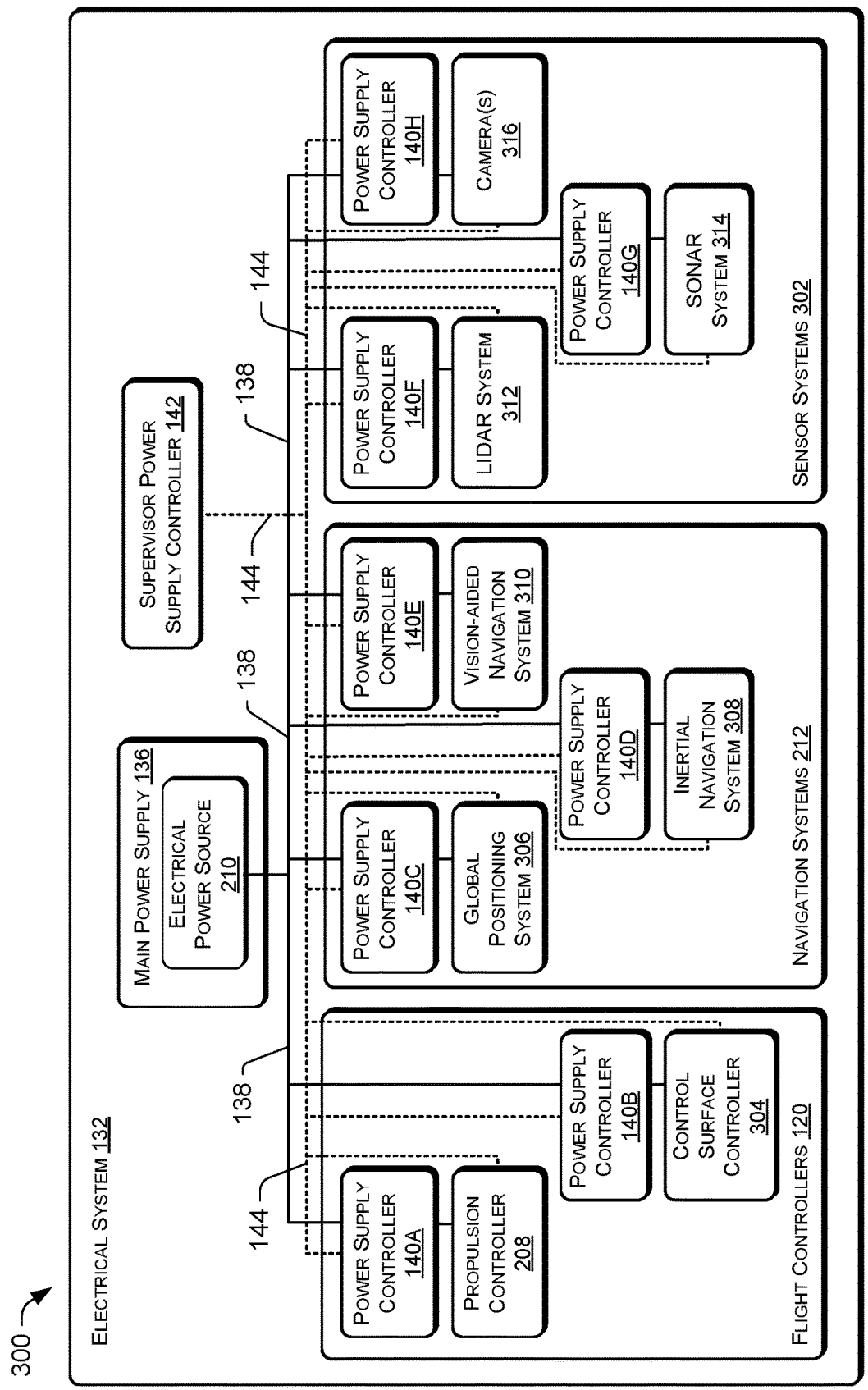
FIG. 3 is a block diagram of an illustrative architecture for an electrical system for a UAV.

FIG. 3 is a block diagram of an illustrative architecture 300 of an illustrative electrical system 132 for a UAV 102. The example electrical system 132 shown in FIG. 3 includes a plurality of example vehicle subsystems in the form electrically-powered and/or electrically-controlled components of the UAV 102 that form the one or more systems that enable and/or control operation of the UAV 102, such as, for example, the flight controllers 120, the navigation systems 212, and the sensor systems 302. For example, the example flight controllers 120 may include the propulsion controller 208 and a control surface controller 304. The propulsion controller 208 may be configured to controller operation of the propulsion subsystem 118 to cause the UAV to ascend, descend, and/or change speed, and in some cases, change direction. The control surface controller 304 may be configured to manipulate control surfaces of the UAV 102 to cause the UAV 102 to maneuver. For example, the control surfaces may include a rudder configured to cause the UAV 102 to turn according to inputs (e.g., signals) received from the control surface controller 304.

The navigation systems 212 may include, for example, a GPS system 306, an INS system 308, and/or a VAINS 310 configured to facilitate navigation of the UAV 102 between its point of origin, such as the fulfillment center 104, and its destination 106 via a flight path 126. The sensor systems 302 may include, for example, one or more LIDAR systems 312, one or more SONAR systems 314, and/or one or more cameras 316 configured to sense objects in the environment 100 and/or assist with navigation of the UAV 102. In some examples, one or more of the sensor systems 302 may form at least part of, for example, the navigation module 122 and/or the object detection module 124.

In the example shown in FIG. 3, the electrical system 132 includes the main power supply 136, which includes the electrical power source 210. The electrical power source 210 may include one or more batteries, such as, for example, rechargeable lithium ion batteries, or similar rechargeable batteries. The main power supply 136 is configured to supply power to the plurality of vehicle subsystems via the main power bus 138. The example shown in FIG. 3 also includes a plurality of power supply controllers 140A-140H electrically connected to the main power supply 136 and configured to selectively electrically connect the main power supply 136 to, and disconnect the main power supply 136 from, respectively, the propulsion controller 208, the control surface controller 304, the GPS 306, the INS 308, the VAINS 310, the LIDAR system 312, the SONAR system 314, and the one or more cameras 316. For example, as shown in FIG. 3, each of the power supply controllers 140A-140H is electrically coupled to the main power bus 138 and is associated, respectively, with the propulsion controller 208, the control surface controller 304, the GPS 306, the INS 308, the VAINS 310, the LIDAR system 312, the SONAR system 314, and the one or more cameras 316. In some examples, one or more of the power supply controllers 140A-140H may be configured to monitor operation of the respective vehicle subsystem and if a fault is detected by the respective power supply controller 140A-140H, disconnect the respective vehicle subsystem from the main power supply 136. For example, if one of the power supply controllers 140A-140H detects an abnormally high (or low) voltage drop, current draw, and or temperature associated with operation of the respective vehicle subsystem, the power supply controller 140 may disconnect the respective vehicle subsystem from the main power supply 136, thereby isolating the vehicle subsystem from the remainder of the electrical system 132, which may prevent a malfunction of the vehicle subsystem from interrupting the power supply to other vehicle sub systems.

In the example shown in FIG. 3, electrical system 132 also includes a supervisor power supply controller 142 in communication with each of the power supply controllers 140A-140H and the vehicle subsystems 208, 304, 306, 308, 310, 312, 314, and 316, for example, via a communication bus 144 coupled to the supervisor power supply controller 142 and each of the power supply controllers 140A-140H and each of the above-noted vehicle subsystems. As explained herein, the supervisor power supply controller 142, in some examples, may be configured to receive signals indicative of the operational status of the UAV 102, for example, from one or more of the power supply controllers 140A-140H and/or one or more of the vehicle subsystems 208, 304, 306, 308, 310, 312, 314, and 316, and determine, based at least in part on the signals indicative of the operational status of the UAV 102, expected signals associated with operation of one or more of the above-noted vehicle sub systems.

As explained herein, the operational status of the example UAV 102 may correspond to being on the ground (or another surface) but neither in the process of landing nor taking-off, being on the ground but in the process of taking-off or landing, being in the air and being in the process of taking-off or landing, being in-flight and either cruising at a substantially constant altitude and/or direction, or being in-flight and ascending, descending, and/or changing direction of travel. The signals indicative of the operational status may be signals received from one or more of the flight controllers 120, the navigation systems 212 (or the navigation module 122), the object detection module 124, and/or the one or more of the sensor systems 302. The supervisor power supply controller 142 may be configured to receive signals from one or more of the various above-identified systems and determine the operational status of the UAV 102.

Based at least in part on these signals indicative of the operational status of the vehicle, the supervisor power supply controller 142 may be configured to determine expected signals associated with operation of one or more of the above-noted vehicle subsystems. For example, based on historical data, the supervisor power supply controller 142 may be configured to determine expected operation of one or more of the vehicle subsystems, or in some examples, at least the expected signals associated with expected operation of the one or more vehicle subsystems. In some examples, the supervisor power supply controller 142 may receive signals associated with operation with one or more of the vehicle subsystems, for example, from one or more of the power supply controllers 140A-140H and/or one or more of the vehicle subsystems 208, 304, 306, 308, 310, 312, 314, and 316. In some examples, the signals associated with operation of the one or more above-noted vehicle subsystems may be indicative of performance of the one or more above-noted vehicle subsystems. The supervisor power supply controller 142 may determine, in some examples, that the signals associated with operation of the one or more above-noted vehicle subsystems are indicative of a fault associated with operation of the one or more above-noted vehicle subsystems.

For example, the signals indicative of the operational status of the UAV 102 may indicate that the UAV 102 is landing. Historical data may indicate that during landing the GPS 306 may not be operating at a high level (e.g., the GPS 306 may not be causing much voltage drop, drawing much current, and/or exhibiting a temperature increase from operation). In contrast, historical data may indicate that during a landing, one or more of the sensor systems 302 (e.g., sensors associated with the object detection module 124) may be operating at a high level (e.g., they may be causing a relatively large voltage drop, drawing a relatively large amount of current, and/or exhibiting a relative temperature increase from operation). Thus, if the supervisor power supply controller 142 receives signals associated with the GPS 306 that indicate operation at a high level, which would be unexpected based on historical data, then the supervisor power supply controller 142 may determine (or predict) that there is a fault with the operation of the GPS 306. In contrast, if the supervisor power supply controller 142 receives signals associated with one or more of the sensor systems 302 during landing of the UAV 102 that indicate operation at a low level (e.g., they may be causing a relatively low voltage drop, drawing a relatively small amount of current, and/or exhibiting little or no relative temperature increase from operation), it may be an indication that the sensor or cameras are not operating properly. Thus, by determining the expected operation of the one or more vehicle subsystems based at least in part on the operational status of the UAV 102, the supervisor power supply controller 142 may be able to detect (or predict) a fault occurring (or about to occur) with operation of one or more vehicle subsystems.

In some examples, the supervisor power supply controller 142 may be further configured to alter operation of the UAV 102 based at least in part on determining that the signals associated with operation of the one or more vehicle subsystems are indicative of a fault associated with operation of the respective vehicle subsystem. For example, the supervisor power supply controller 142 may alter operation of the UAV 102 by discontinuing operation of the respective vehicle subsystem experiencing a fault and isolating the respective vehicle subsystem from the main power supply 136 of the UAV 102. In some examples, the supervisor power supply controller 142 may cause the power system controller 140 associated with the vehicle subsystem experiencing a fault to disconnect the vehicle subsystem from the main power supply 136. In some examples, the supervisor power supply controller 142 may communicate with one or more flight controllers 120 of the UAV 102, so that the one or more flight controllers 120 may cause the UAV 102 to initiate travel to a designated location, such as, for example, a vehicle maintenance or service center, to address the vehicle subsystem experiencing the fault. In some examples, the decision to initiate travel to a designated location may be based on the particular vehicle subsystem experiencing the fault. For example, if the UAV 102 includes several sensor systems, and the supervisor power supply controller 142 determines that one of the sensors (e.g., one of the LIDARs 312) may have a fault, but that the UAV 102 may operate safely using the remaining sensors, then the one or more fight controllers 120 and/or the supervisor power supply controller 142 may control the UAV 102, such that it continues on its flight path 126 to its intended destination 106 instead of initiating travel to the designated location for service.

Figure 4:
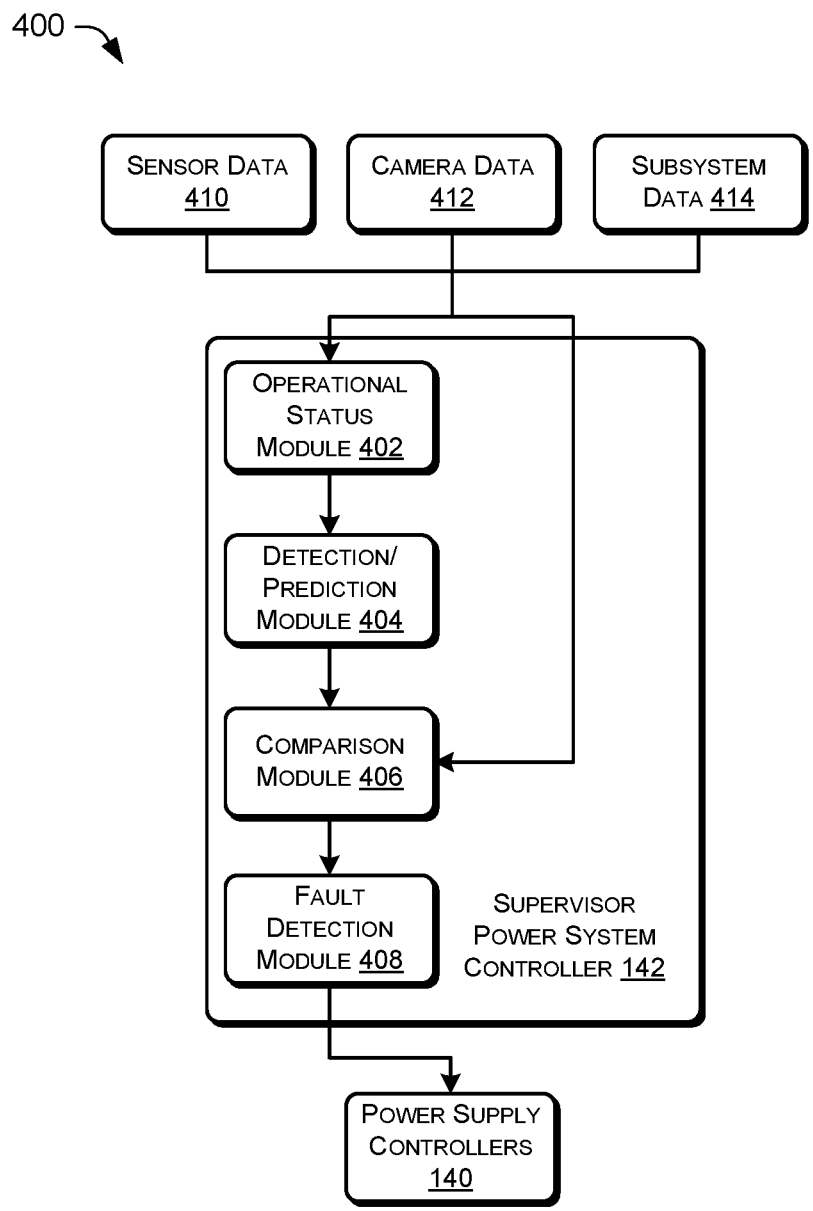
FIG. 4 is a block diagram of a portion of an illustrative electrical system including an illustrative supervisor power supply controller that may be used for supplying power to a UAV.

FIG. 4 is a block diagram of a portion 400 of an illustrative electrical system 132 including an illustrative supervisor power supply controller 142 that may be used for supplying power to the UAV 102. In the example shown in FIG. 4, the supervisor power supply controller 142 includes an operational status module 402, a detection/prediction module 404, a comparison module 406, and a fault detection module 408. The supervisor power supply controller 142 may be configured to receive signals indicative of the operational status of the UAV 102 and signals associated with operation of the vehicle subsystems of the UAV 102. For example, the supervisor power supply controller 142 is configured to receive sensor data 410 from one or more of the sensor systems 302, such as, for example, the LIDAR 312 and/or the SONAR 314, camera data 412 from one or more of the camera(s) 316, and/or any other subsystem data 414 that may be used by the supervisor power supply controller 142.

In some examples, the operational status module 402 may be configured to determine the operational status of the UAV 102 based on one or more of the sensor data 410, the camera data 412, and the subsystem data 414. For example, the operational status module 402 may associate the data received with correlations between data received from the sensors, cameras, and/or vehicle subsystems and the operational status of the UAV 102. The detection/prediction module 404 may be configured to receive the operational status from the operational status module 402 and determine expected signals associated with operation of one or more of the vehicle subsystems of the UAV 102. In some examples, the detection/prediction module 404 may associate the operational status of the UAV 102 with historically-derived correlations between the operational status of the UAV 102 and the signals associated with operation of the one or more vehicle subsystems. For example, during the various operations of the UAV 102, actual signals associated with operation of the vehicle subsystems may be received and stored to create a database of correlations between the operational status and the signals received from the various vehicle subsystems, so that for a given operational status, expected signals associated with operation of the vehicle subsystems may be determined. In some examples, the signals associated with operation of the vehicle subsystems may be indicative of the performance of the respective vehicle subsystems. In some examples, the performance may be related to the voltage at the vehicle subsystem during operation, the current drawn during operation, and/or the temperature of one or more devices associated with the respective vehicle subsystem.

In some examples, the comparison module 406 may be configured to receive data indicative of the expected signals associated with operation of the vehicle subsystems and the actual signals associated with operation of the respective vehicle subsystems. The comparison module 406 may be configured to compare the two sets of signals (expected and actual) and determine differences between the two sets of signals. In some examples, the fault detection module 408 may be configured to receive differences for the respective vehicle subsystems between the expected signals and the actual signals, and determine whether there is a fault in one or more of the vehicle subsystems and/or predict whether a fault is imminent. For example, if the difference is greater than a predetermined threshold, the fault detection module 408 may be configured to identify a fault with the respective vehicle subsystems associated with the difference. If the difference is increasing (e.g., at a rate faster than a predetermined rate), the fault detection module 408 may be configured to predict an imminent fault with the respective vehicle subsystem. In this example manner, the supervisor power supply controller 142 may be configured to detect a fault with operation of a vehicle subsystem and/or predict an imminent fault with operation of a vehicle subsystem. If such a fault is detected or predicted, the supervisor power supply controller 142 may communicate with the power supply controller 140 associated with the respective vehicle subsystem and disconnect the vehicle subsystem from the main power supply 136, for example, as described herein, to prevent interruption of power to the other vehicle subsystems.

Figure 5:
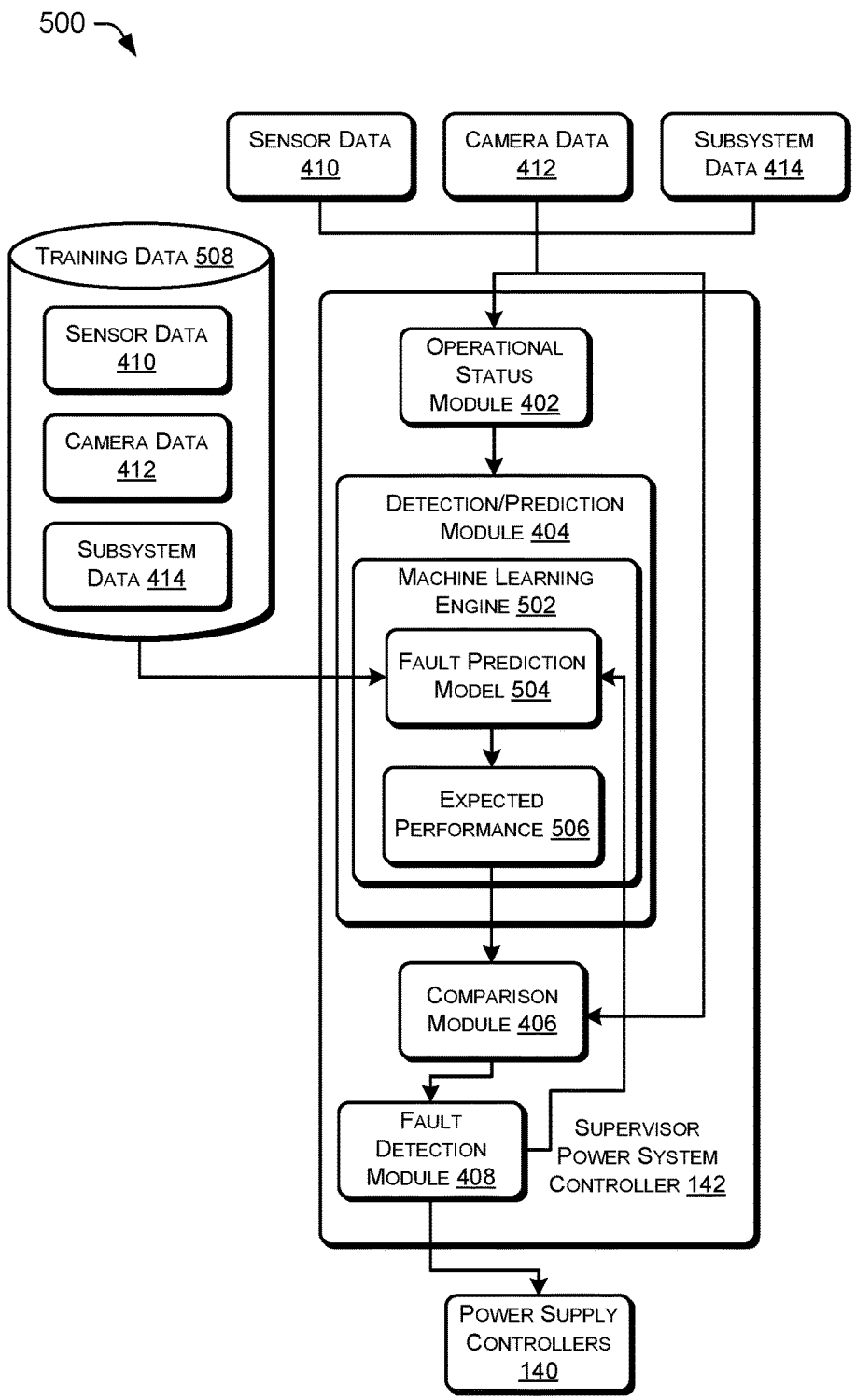
FIG. 5 is a block diagram of a portion of another illustrative electrical system including another illustrative supervisor power supply controller that may be used for supplying power to a UAV.

FIG. 5 is a block diagram of a portion 500 of another illustrative electrical system 132 including another illustrative supervisory power supply controller 142 that leverages a machine learning engine 502. The example shown in FIG. 5 is similar to the example shown in FIG. 4, except the detection/prediction module 404 shown in FIG. 5 includes a machine learning engine 502 configured to execute a fault prediction model 504 to provide the expected performance 506 of one or more of the vehicle subsystems based at least in part on the operational status of the UAV 102 received from the operational status module 402. For example, the fault prediction model 506 may be trained with training data 508 to detect and/or predict a fault with the operation of one or more of the vehicle subsystems based on the operational status of the UAV 102. For example, the training data 502 may include one or more of sensor data 410, camera data 412, and subsystem data 414, and the fault prediction model 504 may use the training data 508 to develop correlations between the operational status of the UAV 102 and the expected performance 506 for each of the one or more vehicle subsystems. The expected performance 506 may correspond to expected signals associated with operation of the respective one or more vehicle subsystems. Once developed, the fault prediction model 504 may be configured to receive the operational status (e.g., the signals indicative of the operational status or the determination from the operational status module 402) and determine the expected performance 506 of the one or more vehicle subsystems. The expected performance (e.g., in the form of expected signals associated with operation of the one or more vehicle subsystems) may be compared to actual signals received from the one or more respective vehicle subsystems by the comparison module 406. As explained above with respect to FIG. 4, the comparison module 406 may be configured to compare the two sets of signals (expected and actual) and determine differences between the two sets of signals, and the fault detection module 408 may be configured to receive differences for the respective vehicle subsystems between the expected signals and the actual signals, and determine whether there is a fault in one or more of the vehicle subsystems and/or predict whether a fault is imminent. For example, if the difference is greater than a predetermined threshold, the fault detection module 408 may be configured to identify a fault with the respective vehicle subsystems associated with the difference. If the difference is increasing (e.g., at a rate faster than a predetermined rate), the fault detection module 408 may be configured to predict an imminent fault with the respective vehicle subsystem.

In addition, once the fault detection module 408 has detected a fault or predicts a fault, the data associated with the detection or prediction may be input into the fault prediction model 504, so that the fault prediction model 504 may be updated with the data to improve the accuracy of the fault prediction model 506 in future determinations. In this example manner, machine learning may be used to improve the accuracy of the detection and/or prediction of faults associated with the one or more vehicle subsystems of the UAV 102.

Figure 6:
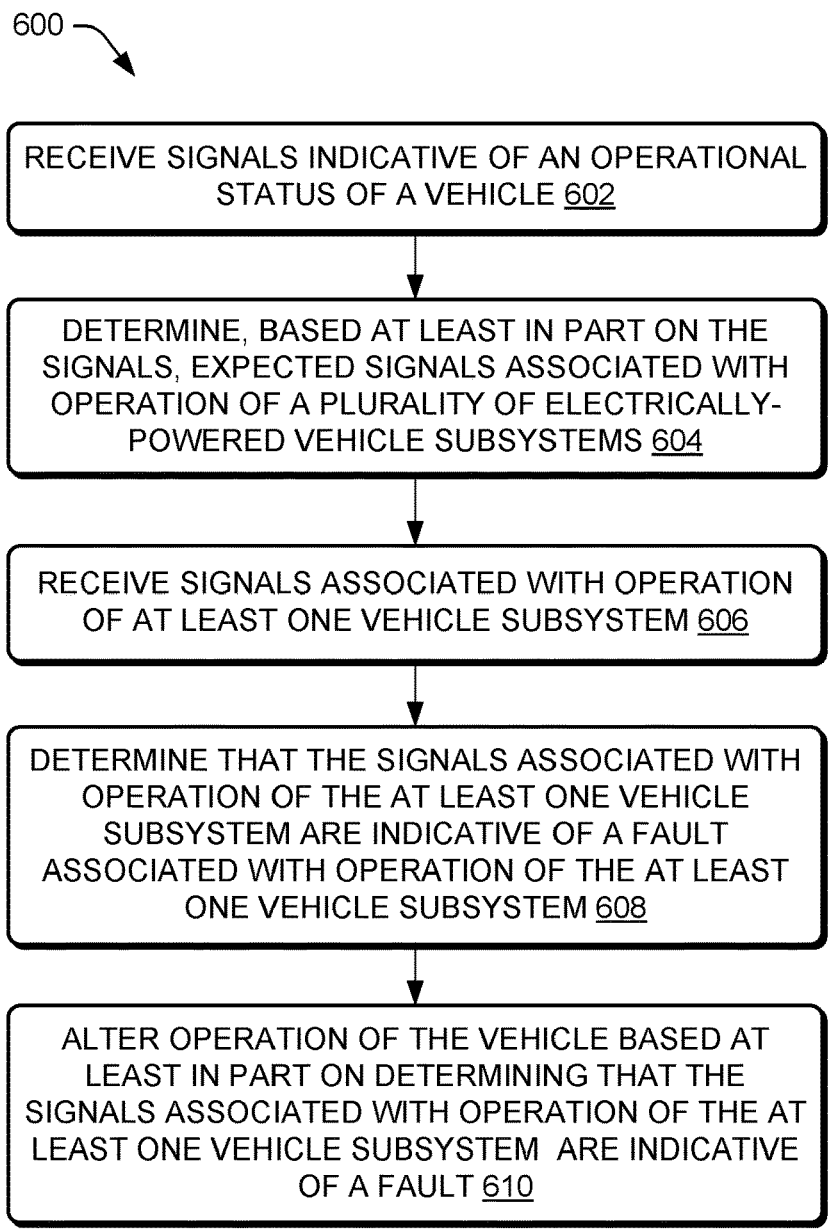
FIG. 6 is a flow diagram of an illustrative process for detecting and/or predicting a fault with a subsystem associated with a vehicle.

FIG. 6 is a flow diagram of an illustrative process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 6 is a flow diagram of an illustrative process 600 for detecting and/or predicting a fault with a subsystem associated with a vehicle. The process 600 may be implemented in the environment 100 and by the UAV architectures 200, 300, 400, and 500 described above, or in other environments and architectures.

In the illustrative process 600, at 602, the process 600 may include receiving signals indicative of an operational status of a vehicle. For example, a supervisor power supply controller may receive signals from one or more of flight controllers, navigation systems, and sensor systems associated with the vehicle. In some examples, an operational status module associated with the supervisor power supply controller may be configured to determine the operational status of the vehicle based on the signals.

At 604, the process 600 may include determining, based at least in part on the signals indicative of the operational status of the vehicle, expected signals associated with operation of a plurality of electrically powered vehicle subsystems. For example, the supervisor power supply controller may include a detection/prediction module configured to determine expected signals associated with operation of one or more vehicle subsystems based on correlations between the operational status of the vehicle and previously received signals associated with operation of the vehicle subsystems during a similar or identical operational status. In some examples, determining the expected signals may include processing data associated with operation of the vehicle via a fault prediction model deployed by a machine learning engine.

At 606, the process 600 may include receiving signals associated with operation of at least one vehicle subsystem. In some examples, the signals associated with operation of the at least one vehicle subsystem may be indicative of performance of the at least one vehicle subsystem.

The example process 600, at 608, may include determining that the signals associated with operation of the at least one vehicle subsystem are indicative of a fault associated with operation of the at least one vehicle subsystem. In some examples, a comparison module may be configured to receive the expected signals determined, for example, at 604, and the actual signals received at 606, and compare the two sets of signals (expected and actual) and determine differences between the two sets of signals. In some examples, a fault detection module may be configured to receive differences for the respective vehicle subsystems between the expected signals and the actual signals, and determine whether there is a fault in one or more of the vehicle subsystems and/or predict whether a fault is imminent.

At 610, the process 600 may include altering operation of the vehicle based at least in part on determining that the signals associated with operation of the at least one vehicle subsystem are indicative of a fault associated with operation of the at least one vehicle subsystem. For example, the supervisor power supply controller may communicate with the power supply controller associated with the respective vehicle subsystem and disconnect the vehicle subsystem from a main power supply, for example, as described herein, to prevent interruption of power to the other vehicle subsystems connected to the main power supply.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
 a main power supply configured to supply electrical power to one or more vehicle sub systems;
 one or more power supply controllers electrically connected to the main power supply; and
 a supervisor power supply controller in communication with the one or more power supply controllers, the supervisor power supply controller being configured to:
  receive a first signal indicative of an operational status of a vehicle;
  determine, based at least in part on the first signal, a first expected signal associated with operation of a first vehicle subsystem;
  receive a second signal associated with the operation of the first vehicle sub system;
  determine that the second signal is outside a range of the first expected signal; and
  cause, based at least in part on the second signal being outside the range of the first expected signal, the one or more power supply controllers to perform one or more operations with respect to the main power supply.

2. The electrical system as recited in claim 1, wherein the one or more power supply controllers is configured to disconnect from the main power supply, and wherein the supervisor power supply controller is further configured to:
 alter operation of one or more of a flight controller, a navigation system, or a sensor; and
 determine the first expected signal using one or more of heuristics or machine learning.

3. The electrical system as recited in claim 1, wherein the supervisor power supply controller is configured to determine the first expected signal by processing data associated with the operation of the vehicle via a fault prediction model, the fault prediction model being trained via at least one of sensor data, camera data, or subsystem data.

4. A method comprising:
 receiving, by a supervisor power supply controller of a vehicle, a first signal indicative of an operational status of the vehicle;
 determining, by the supervisor power supply and based at least in part on the first signal, an expected signal associated with operation of one or more vehicle subsystems;
 receiving, by the supervisor power supply, a second signal associated with operation of at least one vehicle subsystem of the one or more vehicle subsystems;
 determining, by the supervisor power supply and based at least in part on the expected signal, that the second signal is indicative of a fault associated with the operation of the at least one vehicle subsystem; and
 causing, by the supervisor power supply and based at least in part on the second signal, one or more power supply controllers of the vehicle to alter an operation of the vehicle with respect to a main power supply of the vehicle.

5. The method as recited in claim 4, wherein the first signal indicates that the vehicle is taking off, flying, or landing.

6. The method as recited in claim 4, wherein determining the expected signal comprises processing data associated with the operation of the vehicle via a fault prediction model.

7. The method as recited in claim 6, further comprising training the fault prediction model via training data comprising at least one of sensor data, camera data, or subsystem data.

8. The method as recited in claim 4, wherein causing the operation of the vehicle to be altered comprises discontinuing the operation of the at least one vehicle subsystem and isolating the at least one vehicle subsystem from the main power supply.

9. The method as recited in claim 4, wherein causing the operation of the vehicle to be altered comprises causing the vehicle to initiate travel to a designated location.

10. The method as recited in claim 4, wherein determining that the second signal is indicative of the fault comprises comparing the second signal associated with the operation of the at least one vehicle subsystem with the expected signal associated with the operation of the one or more vehicle subsystems.

11. The method as recited in claim 4, wherein determining that the second signal is indicative of the fault comprises at least one of detecting or predicting that the at least one vehicle subsystem is operating outside expected operational parameters based at least in part on the first signal.

12. The method as recited in claim 4, wherein determining the expected signal comprises using the first signal to identify from previous operation of the vehicle a previously received signal associated with the operation of the one or more vehicle subsystems corresponding to the operational status of the vehicle.

13. The method as recited in claim 4, wherein the second signal indicates at least one of a voltage, a current, or a temperature associated with the operation the at least one vehicle subsystem.

14. The method as recited in claim 4, wherein the vehicle comprises an unmanned aerial vehicle (UAV), and the at least one vehicle subsystem comprises one of at least one navigation system or at least one sensor system.

15. The method as recited in claim 4, wherein causing the operation of the vehicle to be altered comprises disconnecting the at least one vehicle subsystem from the main power supply to prevent interruption of power to other vehicle subsystems of the one or more vehicle subsystems connected to the main power supply.

16. A vehicle comprising:
a frame;
a propulsion system coupled to the frame to cause movement of the vehicle; and
an electrical system comprising:
   a main power supply configured to supply electrical power to one or more vehicle subsystems;
   a power supply controller configured to electrically connect the main power supply to, and disconnect the main power supply from, a vehicle subsystem of the one or more vehicle subsystems; and
   a supervisor power supply controller in communication with the power supply controller, the supervisor power supply controller being configured to:
      receive a signal associated with operation of the vehicle subsystem;
      determine that the signal is indicative of a fault associated with the operation of the vehicle subsystem; and
      alter operation of the vehicle based at least in part on the signal being indicative of the fault.

17. The vehicle as recited in claim 16, wherein the main power supply comprises at least one battery, and the supervisor power supply controller is configured to receive a second signal indicative of a level of charge of the at least one battery, and wherein, based at least in part on a determination that the level of charge is below a minimum level of charge, the supervisor power controller is configured to cause at least one of the one or more vehicle subsystems to discontinue operation.

18. The vehicle as recited in claim 17, wherein the one or more vehicle subsystems comprise one or more navigation systems and one or more sensor systems, and wherein the supervisor power supply controller is configured to cause at least one navigation system of the one or more navigation systems or at least one sensor system of the one or more sensor systems to discontinue operation.

19. The vehicle as recited in claim 16, wherein the power supply controller is configured to detect the fault and, upon detection of the fault, disconnect the vehicle subsystem from the main power supply.

20. The vehicle as recited in claim 16, wherein the power supply controller is configured to:
receive a second signal associated with at least one of voltage, a current, or a temperature associated with the operation of the vehicle subsystem;
determine that the second signal is indicative of the fault; and
discontinue the operation of the vehicle subsystem based at least in part on determining that the second signal is indicative of the fault.

* * * * *